(No Model.) 2 Sheets—Sheet 1.

W. P. AUSTIN.
TRAP.

No. 424,162. Patented Mar. 25, 1890.

WITNESSES: INVENTOR
William P. Austin
BY his ATTORNEY (No Model.) 2 Sheets—Sheet 2.

W. P. AUSTIN.
TRAP.

No. 424,162. Patented Mar. 25, 1890.

UNITED STATES PATENT OFFICE.

WILLIAM P. AUSTIN, OF NEW YORK, N. Y.

TRAP.

SPECIFICATION forming part of Letters Patent No. 424,162, dated March 25, 1890.

Application filed February 14, 1889. Serial No. 299,905. (No model.)

*To all whom it may concern:*

Be it known that I, WILLIAM P. AUSTIN, a citizen of the United States of America, residing at the city of New York, in the county and State of New York, have invented a new and useful Trap for Use in Plumbing Work and Analogous Places, of which the following is a specification, reference being had to the accompanying drawings, forming part of the same, in which—

Figures 1, 2:
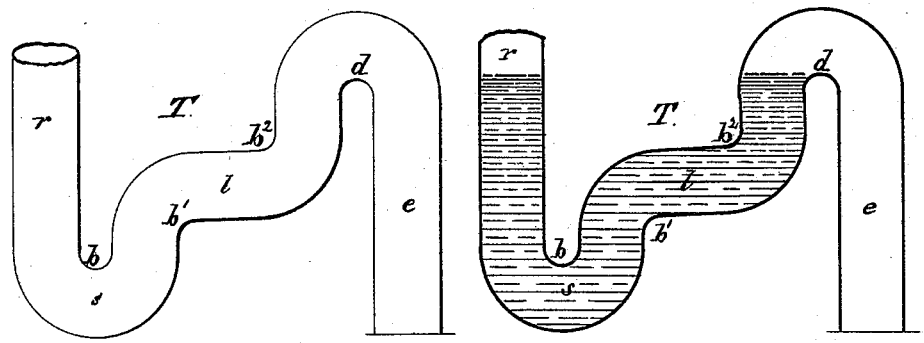
Figures 3, 4:
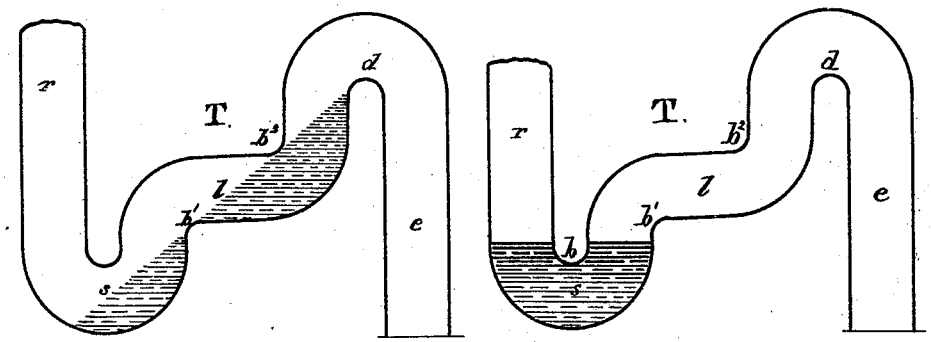
Figure 8:
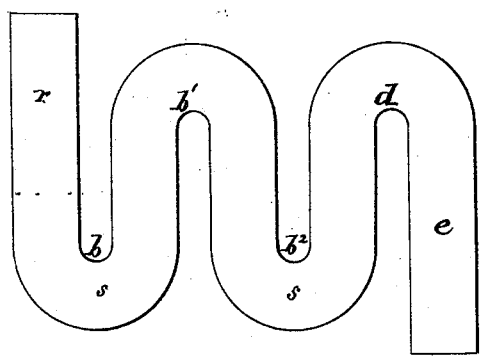
Figure 5:
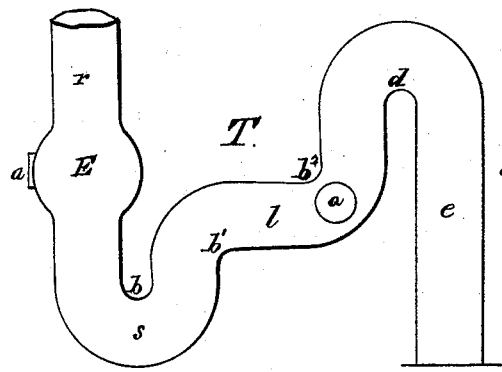
Figure 6:
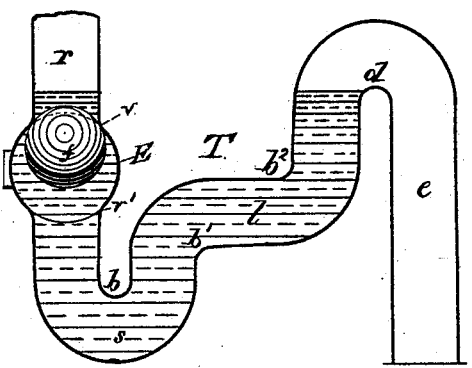
Figure 7:
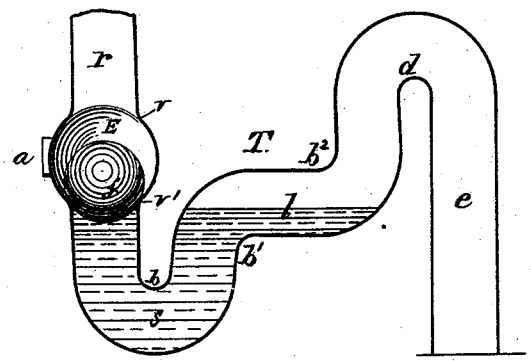

Figure 1 is a side elevation of my new trap. Fig. 2 is a vertical longitudinal sectional view of the same, showing the liquid seal which ordinarily exists when the trap is in use. Fig. 3 is a similar view showing the interior when as much liquid as can be has been siphoned out. Fig. 4 is a third view of a similar section, showing the seal caused by the return of the liquid left in the trap, as shown in Fig. 3. Fig. 5 is a side elevation of my new trap with a float-valve added. Fig. 6 is a vertical longitudinal sectional view of the trap shown in Fig. 5, with the seals in their ordinary condition. Fig. 7 is a similar view of said trap when as much liquid as possible has been removed by the siphon, and Fig. 8 is a side elevation of a defective form of trap.

Traps of various kinds, sizes, and forms have been heretofore devised with the object of overcoming the siphon action which takes place in an ordinary S-trap, in order that there may always remain in the trap sufficient liquid to make a seal when the suction ceases, which takes place whenever a full stream of liquid is run through the trap, and which suction, if the discharge-pipe is long, will almost entirely empty the ordinary form of trap. I have myself heretofore effected this result by placing an enlarged chamber between the initial seal and the discharge-pipe of the trap; but many object to any trap with such an enlarged chamber on the ground that the enlargement forms a receptacle for grease and other objectionable matter, which will not be forced out at each movement of liquid through the trap, and that consequently the trap will become foul, if not entirely choked, and thus an element of danger to the public health. These objections are entirely overcome in the trap herein described, the main features of which are an ordinary seal, a liquid-space beyond it, and a second bend or dam beyond said space, the entire trap beyond the seal being of one diameter.

In the drawings, T is the trap, consisting of the receiving end $r$, the sealing-bend $s$, (generally called the "seal,") the main level $l$, beyond the seal, the dam $d$, and the exit $e$.

$a$ $a$ are trap-screws, which may be provided for convenience.

The operation of this trap is obvious. Liquid being introduced into $r$, flows on through $s$, and rises and fills it and $l$ until it reaches the top of dam $d$, when it will appear as shown in Fig. 2. The introduction of more liquid will cause an overflow at $d$ into the discharge $e$, and thence to the sewer-pipe or other conduit. Under ordinary conditions the liquid in the trap will at all times remain at the height shown in Fig. 2, thus making an effective seal from $d$ to above $s$, entirely shutting off offensive gases. Now, if by the discharge of an unusually-large quantity of liquid under great pressure an unusual suction is produced, such as would siphon out of an ordinary S-trap so much of the liquid as not to leave sufficient to form a seal at $s$, it will be found that in this trap, as soon as the liquid is drawn out until it is below a line extending from the top of dam $d$, under bend $b^2$, to or near bend $b'$ the air will pass through the opening thus left and the siphon action will immediately cease, leaving the liquid below that line in the main level, as shown in Fig. 3, from which it will at once flow back and, together with what remains at $s$, will fill the bend and make a seal, as shown in Fig. 4, thus accomplishing the object sought.

To make an entirely successful trap, care should be taken that the level of bend $b^2$ is not, as shown in Fig. 8, below the level of bend $b'$, for there would then be two liquid seals both below a given point, and a vacuum would be likely—indeed, would be almost certain—to be formed between said seals and prevent the operation of the trap unless a vent-pipe should be connected to the trap at that point. The trap being of one diameter from the seal $s$ onward, it is thoroughly washed each time liquid passes through it, thus preventing any accumulation of matter therein and avoiding its choking or fouling. This is facilitated by the drawing up of a portion of the water and its return to the bend.

To further insure that the trap shall never be entirely emptied, and to also prevent gases from escaping through the trap by passing through the liquid seal, which, when as shown in Fig. 4, is not as deep as I prefer, I have added a float-valve, the upper seat $v$ of which I locate a little below the level of the dam $d$, in order that the float-valve $f$, which may be a rubber ball, shall ordinarily be submerged. It is thereby kept clean and its useful life prolonged. This arrangement also prevents overflow in case the water backs up from any cause, as the float-valve would close and effectually prevent any further progress of the backed-up liquid. When the suction is sufficient to draw the liquid in the valve enlargement E down to or below the lower seat $v'$, the float-valve $f$ will of course drop down and rest upon that seat, thereby closing the trap and preventing any further forcing of liquid out of it by the pressure of air entering through $r$.

The operation of this added feature is so obvious as to need no further explanation.

I usually make the dimensions of the float and the enlargement such that the cross-area of the space between the float and the inner walls of the enlargement shall about equal the cross-area of the other portions of the trap, which arrangement insures the continued cleansing of the enlarged space, though this is not absolutely necessary, nor is it so necessary with this arrangement that the parts should be of one diameter. I also place a strainer above $v$, that the ball-valve may not by an excessive flow of water be forced too tightly down upon $v'$.

I am aware of the existence of traps such as shown in Letters Patent Nos. 253,852, 311,146, and 387,252; but they do not possess all the features of mine. I do not mean to here claim such apparatus.

What I claim as my invention, and desire to secure by Letters Patent, is—

The combination, in a trap composed substantially of a continuous pipe of one diameter from the seal onward, of a receiving-pipe, a discharge-pipe, a seal-bend, a main level beyond and above said seal-bend, the upper wall of which level is wholly above the level of the highest portion of its lower wall, and a second bend or dam above and beyond said main level, all substantially as set forth.

WM. P. AUSTIN.

Witnesses:
A. G. N. VERMILYA,
EDWARD STEPHENS.